Jan. 20, 1970  O. J. SCHWERTFEGER ETAL  3,490,249
LIQUID CARBONATING APPARATUS
Filed Feb. 8, 1968  3 Sheets-Sheet 1
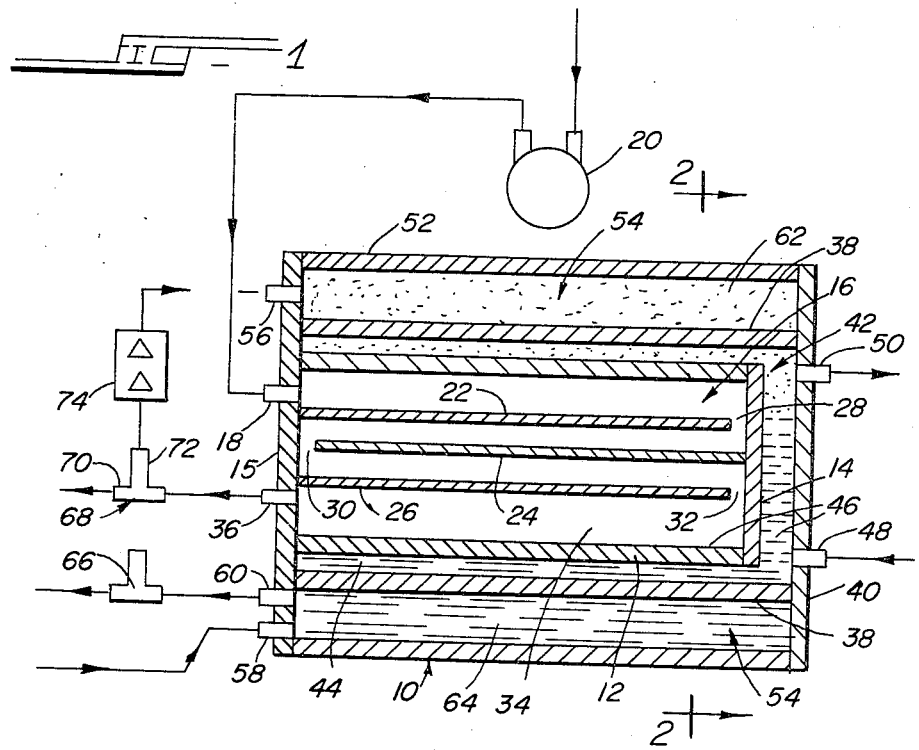
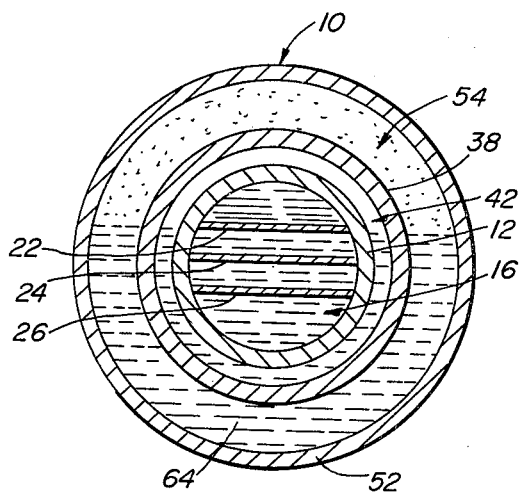
INVENTORS.
OWEN J. SCHWERTFEGER
ROY A. JOHNSON
FRANK D. BRILL
BY Gomer W. Walters
ATTY.

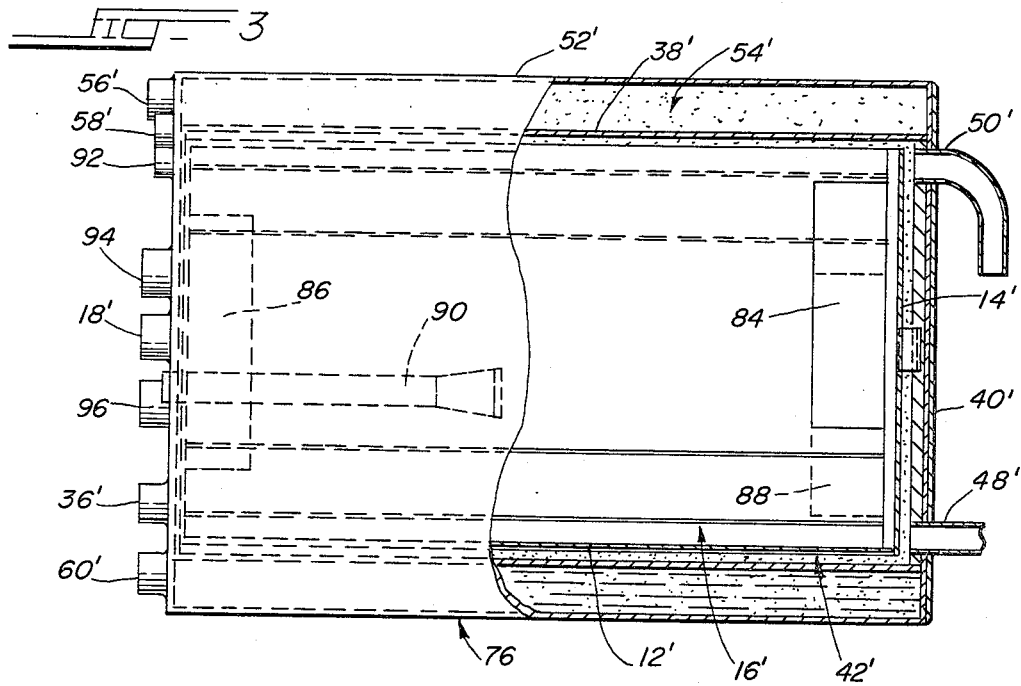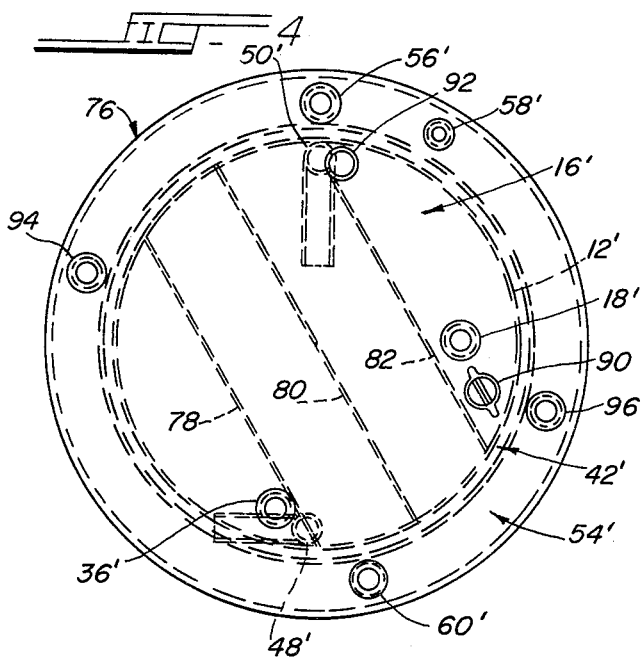

Jan. 20, 1970   O. J. SCHWERTFEGER ETAL   3,490,249
LIQUID CARBONATING APPARATUS
Filed Feb. 8, 1968   3 Sheets-Sheet 3
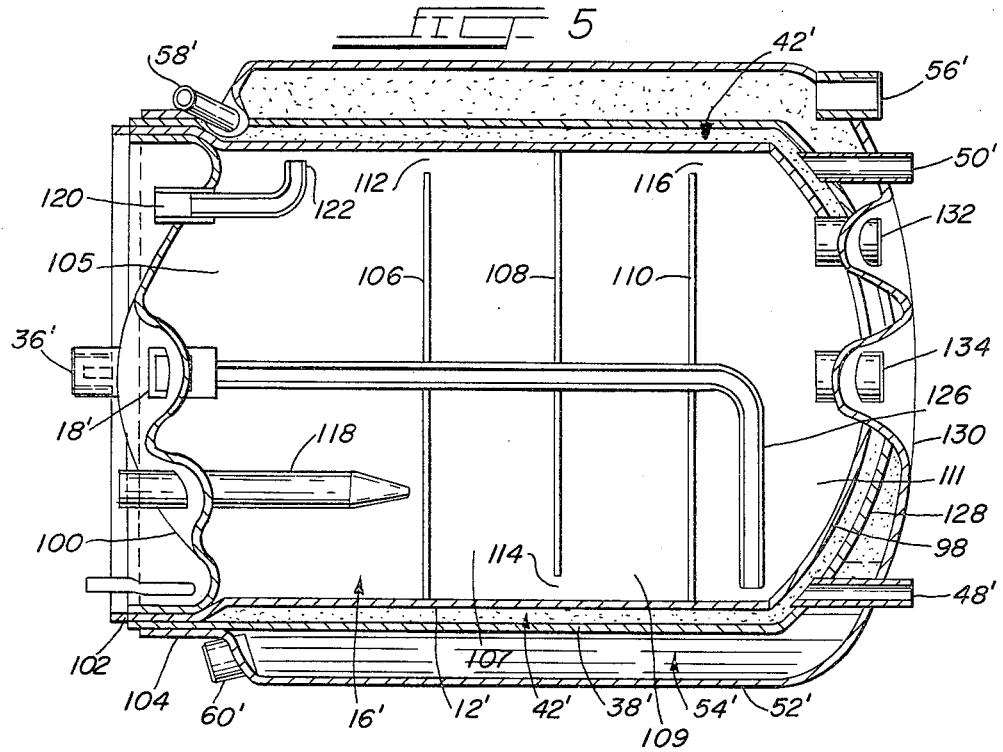
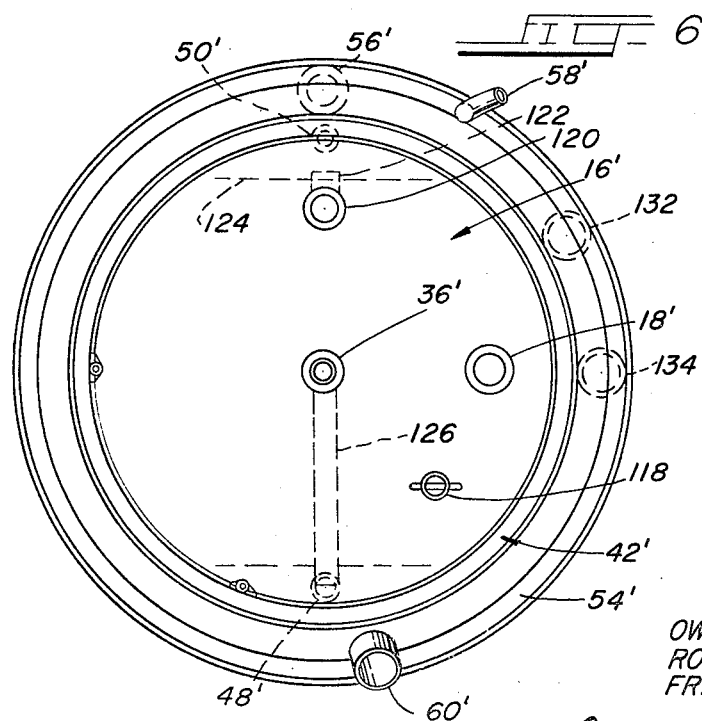
INVENTORS.
OWEN J. SCHWERTFEGER
ROY A. JOHNSON
FRANK D. BRILL
BY Gomer W. Walters

United States Patent Office 3,490,249
Patented Jan. 20, 1970

3,490,249
LIQUID CARBONATING APPARATUS
Owen J. Schwertfeger and Roy A. Johnson, Chicago, and Frank D. Brill, Norridge, Ill., assignors to The Seeburg Corporation, Chicago, Ill., a corporation of Delaware
Filed Feb. 8, 1968, Ser. No. 704,004
Int. Cl. F28d *3/00;* B01f *3/04;* F25c *17/02*
U.S. Cl. 62—171                                14 Claims

ABSTRACT OF THE DISCLOSURE

A horizontal cooler-carbonator arrangement having three chambers formed by three telescoped containers is illustrated. An innermost liquid storage chamber is partially surrounded by a refrigeration chamber, and the refrigeration chamber is partially surrounded by a carbonation chamber. An appropriate liquid (e.g., water) is introduced into the liquid storage chamber where it is cooled and then sprayed into the carbonation chamber to contact and absorb carbon dioxide gas that is introduced into the carbonation chamber under pressure. The carbonated liquid is then collected at the bottom of the carbonation chamber to be stored until withdrawn for consumption or other use.

BACKGROUND OF THE INVENTION

Field of the invention

This invention relates generally to an apparatus for cooling and carbonating a liquid, and more particularly this invention relates to a horizontally positioned cooler-carbonator having three concentric chambers with the carbonation chamber farthest removed from the central axis of the cooler-carbonator.

Description of the prior art

A liquid can be caused to absorb carbon dioxide to produce a carbonated liquid suitable as a beverage or for other purposes. In most applications it is desirable to have as much carbonation as possible. To achieve increased carbonation, it is necessary to maximize the physical factors that tend to increase the absorption of carbon dioxide by the liquid and hence increase the absorption ratio (i.e., volume of carbon dioxide gas absorbed per volume of liquid). The more important factors that tend to increase the absorption ratio are: an increase in the time that the carbon dioxide gas is in contact with the liquid; an increase in carbon dioxide pressure; a decrease in the temperature of the liquid, the carbon dioxide, and the surroundings; and an increase in the area of liquid exposed to carbon dioxide gas.

Because of the demand for carbonated beverages, liquid carbonators are well known to the art. One type of prior art carbonator uses a piston arrangement that is actuated by various mechanical or hydraulic means. The piston arrangement serves the dual purpose of pumping the liquid through the carbonation system and dispensing a predetermined volume of carbonated beverage into a cup or glass. This method of carbonation has been found to be deficient because it requires an expensive and complicated piston and valve arrangement which is subject to mechanical failure. In addition, the absorption ratio is quite low in relation to the energy supplied to the carbonator.

Another example of carbonators heretofore known is the vertical-axis cylindrical-chamber type of carbonator apparatus. This type of carbonator has a cylindrical carbonation chamber with a vertical axis. A refrigeration chamber surrounds the carbonation chamber, and immediately adjacent the external surface of the refrigeration chamber there is located a liquid storage chamber which will frequently take the form of conduit or tubing coiled around the refrigeration chamber. This arrangement for a carbonator is unsatisfactory because the liquid droplets sprayed into the top of the carbonation chamber immediately fall unimpeded to the bottom of the chamber, thereby reducing the time that the liquid is in contact with the carbon dioxide gas.

Consequently, in order to increase the amount of time that the liquid is in contact with the carbon dioxide gas, a baffle arrangement or a finely divided material, such as steel wool, is placed in the carbonation chamber to slow the descent of the liquid droplets and thereby increase the time that the liquid is in contact with the carbon dioxide gas. Such baffle or finely divided material arrangements in the carbonation chamber, while making these carbonators practically feasible, still leave much room for improvement in the absorption ratio because of the inefficient heat transfer between the liquid and the refrigeration chamber surface, the still relatively small absorption area, and the relatively short time permitted for absorption. The falling liquid predominately comes in contact with the baffle arrangement or the finely divided material, and only a small quantity of the liquid comes in contact with the wall of the refrigeration chamber. This is especially true in the case of the finely divided material arrangement, while the baffle arrangement has the additional disadvantage of recombining the liquid droplets sprayed into the carbonation chamber to thereby further decrease the area of the liquid exposed to the carbon dioxide. Both of these conditions, along with the time and area limitations, tend to lower the absorption ratio and thus decrease the effectiveness of the carbonator.

The vertically positioned carbonator also has the disadvantage that liquid to be introduced into the carbonation chamber must be drawn from the bottom of the liquid storage chamber and transported to the top of the carbonation chamber. As this path is along the entire length of the carbonator, the liquid taken from the liquid storage chamber is not refrigerated for a relatively long span, and hence its temperature increases.

SUMMARY OF THE INVENTION

As a result of the deficiencies noted above, prior art carbonators have not produced the maximum absorption of carbon dioxide by a liquid that is possible for a given refrigeration chamber temperature and a given carbonation chamber pressure. The present invention obviates many of the prior art deficiencies and increases the absorption rate of a liquid for a given refrigeration chamber temperature and a given carbonation chamber pressure.

Briefly, in the preferred embodiments disclosed herein, a cooler-carbonator is made up of three chambers formed by three telescoped containers of decreasing diameter. While not limited thereto, the containers are preferably concentric cylinders forming two concentric substantially annular chambers and an innermost cylindrical chamber. A suitable liquid is pumped into the innermost chamber (i.e., a liquid storage chamber) and the liquid is cooled therein as a result of heat transfer to a middle chamber (i.e., a refrigeration chamber) which partially surrounds the liquid storage chamber. A baffle arrangement is interiorly positioned in the liquid storage chamber to direct the flow of the newly-introduced liquid to prevent the mixing of the cooled liquid with the warmer newly-introduced liquid. A compressed liquid refrigerant is sprayed into the middle chamber to produce a decrease in temperature and hence refrigerate the other chambers.

Cooled liquid is removed from the liquid storage chamber and sprayed through a nozzle into an outermost chamber (i.e., a carbonation chamber) which partially surrounds the refrigeration chamber. As the small droplets of liquid produced by the spray nozzle descend, they come in contact with gaseous carbon dioxide which is introduced into the carbonation chamber under pressure. Contact between the liquid and the carbon dioxide is maintained as the droplets flow around and over the smaller diameter wall of the carbonation chamber (which is also the larger diameter or exterior wall of the refrigeration chamber). This intimate contact of the droplets with the refrigeration chamber exterior wall increases the efficiency of the heat transfer process because of the increased cooling of the droplets, thereby maintaining the temperature of the liquid as close to its freezing point as desired. Also, since the droplets do not drop directly to the bottom of the carbonation chamber but flow over and around the smaller diameter wall of the carbonation chamber, the length of time the liquid is in contact with the carbon dioxide gas is increased. Further, the liquid droplets are distributed over the whole axial length of the smaller diameter wall of the carbonation chambers so that the liquid area contacted by the carbon dioxide is also increased.

The cool carbonated liquid is then collected in the bottom of the carbonation chamber, and the level of the carbonated liquid is maintained by various regulatory means. The carbonated liquid may then be drawn off as required from the bottom of the carbonation chamber.

Flow of liquid into the liquid storage chamber and from the liquid storage chamber to the carbonation chamber is achieved by appropriate plumbing. As the distance from the bottom of the liquid storage chamber to the top of the carbonation chamber is only the width, not the length, of the carbonator, the connections therebetween are considerably shorter than for a conventional vertical carbonator, so that heating of the liquid during passage therethrough is considerably reduced.

The compressed refrigerant is introduced into the refrigeration chamber, and the expanded refrigerant is removed therefrom, by appropriate plumbing connected to a coventional refrigeration compressor system. Regulation of the amount of liquid introduced into the cooler-carbonator is achieved by means of solenoid valves actuated by appropriate regulatory apparatus. As the carbonated liquid is removed from the bottom of the carbonation chamber and the level of carbonated liquid in the chamber is lowered, the solenoid valves are actuated to introduce additional liquid into the system.

Accordingly, it is a primary object of this invention to provide a cooler-carbonator that maximizes the absorption of carbon dioxide by a liquid at a given refrigeration chamber temperature and carbonation chamber pressure, or conversely to provide a cooler-carbonator in which the same carbonation may be achieved as in conventional units, but at a lower carbonation chamber pressure and/or higher refrigeration chamber temperature.

Another object of this invention is to provide a cooler-carbonator in which the area of liquid in contact with carbon dioxide is increased both upon initial spraying of the liquid into the carbonation chamber and during passage of the liquid through the carbonation chamber.

Yet another object of this invention is to provide a cooler-carbonator in which the time that the liquid is in contact with the carbon dioxide is increased.

A further object of this invention is to provide a cooler-carbonator in which heat transfer between the liquid in the carbonation chamber and the refrigeration chamber is more efficient.

Still a further object of this invention is to provide a cooler-carbonator in which heating of the liquid as it is transported from the liquid storage chamber to the carbonation chamber is minimized.

These and other objects, advantages, and features of the subject invention will hereinafter appear and, for purposes of illustration, but not of limitation, exemplary embodiments of the subject invention are shown in the appended drawing.

BRIEF DESCRIPTION OF THE DRAWING

FIGURE 1 is a schematic diagram of a carbonating system in which a generalized version of a preferred embodiment of this invention is shown in cross section.

FIGURE 2 is a sectional view taken along line 2—2 of FIGURE 1.

FIGURE 3 is a side view of another embodiment of this invention, partially broken away at the right hand end thereof.

FIGURE 4 is a front view of the embodiment illustrated in FIGURE 3.

FIGURE 5 is a side view of still another embodiment of the present invention, broken away but for a portion at each end thereof.

FIGURE 6 is a front view of the embodiment illustrated in FIGURE 5.

DETAILED DESCRIPTION OF THE PREFERRED EMBODIMENTS

With reference to the drawing, FIGURES 1 and 2 show a generalized version of a preferred embodiment of a cooler-carbonator 10 constructed in accordance with the principles of this invention. This generalized version of the cooler-carbonator of this invention is illustrated in combination with various other elements of the carbonation system, the latter being shown in schematic form. These drawings illustrate the essential features of the present invention and permit a simplified description of the flow path, while subsequent figures more fully illustrate the particular details of construction of the preferred embodiments of this invention.

The generalized cooler-carbonator 10 has an innermost cylindrical container 12. Cylindrical container 12 has a circular end plate 14 securely fastened to the right end (FIGURE 1 orientation) thereof in a tight sealing relationship. The other end of container 12 is sealed by an end wall 15 of the carbonator apparatus 10. Thus, liquid storage chamber 16 is formed within container 12.

The liquid to be carbonated (e.g., water) is introduced into liquid storage chamber 16 through an appropriately controlled inlet port 18. The liquid introduced into chamber 16 through inlet port 18 is pumped from a suitable reservoir or other source (not shown) by a pump 20. Pump 20 is appropriately controlled to introduce a new supply of liquid into the liquid storage chamber 16 as the liquid in chamber 16 is removed.

As the liquid is introduced into a liquid storage chamber 16 through inlet port 18, it passes along the top surface of a baffle 22 for the length of chamber 16, after which it is conveyed to the top of a baffle 24 through an opening 28 at the end of baffle 22. The liquid is then returned to the inlet end of liquid storage chamber 16 along baffle 24, where it is then passed to the top surface of a baffle 26 through an opening 30 in baffle 24. Once again the liquid is transported the length of chamber 16 on the top surface of baffle 26 before being passed through an opening 32 at the end of baffle 26 to a storage area 34 of liquid storage chamber 16. During the reciprocating descent along the baffles, the liquid has its temperature lowered considerably below the temperature of the incoming liquid. Thus, the liquid in storage portion 34 of liquid storage chamber 16 has a temperature much closer to the temperature of the liquid already in storage section 34 than does the liquid introduced through inlet port 18. Further, opening 32 is considerably closer to the liquid in storage section 34 so that there is not as much mixing of the incoming liquid and the stored liquid as there would be if the liquid were directly introduced from inlet port 18 into storage section 34. In this manner, the liquid in the left hand (FIGURE 1 orientation) portion of storage section 34 of liquid storage chamber 16 is relatively undiluted by the newly introduced liquid. The relatively undisturbed liquid at the left-hand (FIGURE 1 orientation) end of section 34 may then be removed through an appropriate outlet port 36.

Surrounding cylindrical container 12 is another cylindrical container 38. Cylindrical container 38 is concentric with cylindrical container 12 and is sealed at its left end (FIGURE 1 orientation) by end wall 15 of cooler-carbonator 10 and at its right end by end wall 40 of cooler-carbonator 10. The cylindrical container 38, sealed at the ends by end walls 15 and 40, along with container 12 and end plate 14 forms a refrigeration chamber 42. Refrigeration chamber 42 has an annular portion 44 coextensive with the length of container 12 and a short cylindrical portion 46 between end wall 14 of container 12 and end wall 40 of cooler-carbonator 10.

Refrigeration chamber 42 is a conventional type of refrigerating unit in which a compressed liquid refrigerant is passed through an expansion valve (not shown) thus lowering the pressure of the liquid below its vapor pressure. The expanding refrigerant absorbs a quantity of heat equal to the heat of vaporization and evaporates. The heat transfer to the refrigerant lowers the temperature of the refrigeration chamber 42 and its surroundings. The expansion valve is associated with an inlet port 48 that extends into chamber 42. The evaporated refrigerant is removed from chamber 42 through an exit port 50. Refrigeration chamber 42 cools the newly introduced liquid in liquid storage chamber 16 and maintains the liquid stored in chamber 16 at a desired low temperature.

Container 38 is surrounded by a third cylindrical container 52, which is also concentric with containers 12 and 38. Container 52 is sealed at its left end (FIGURE 1 orientation) by end wall 15 and at its right end by end wall 40 of cooler-carbonator 10, as is container 38. Container 52 and container 38 form an annular carbonation chamber 54 that extends the length of cooler-carbonator 10. Carbonation chamber 54 has a liquid inlet port 56, a carbon dioxide inlet port 58, and a carbonated liquid outlet port 60.

Liquid from liquid storage chamber 16 is introduced into carbonation chamber 54 through the liquid inlet port 56. A spray nozzle (not shown) is placed at the inner end of liquid inlet port 56 so that the incoming liquid is sprayed as liquid droplets along the length of carbonation chamber 54 in an upper portion 62 thereof. As the sprayed liquid descends through carbonation chamber 54, it comes into contact with carbon dioxide gas introduced through port 58. During contact with the carbon dioxide, the liquid absorbs some of the carbon dioxide and becomes "carbonated." The carbonated liquid is then stored in a bottom portion 64 of carbonation chamber 54.

As the liquid droplets are sprayed into chamber 54, they encounter a relatively large air space due to the horizontal disposition of the cooler-carbonator 10, and initial carbonation of the liquid occurs in this relatively large air space. The liquid droplets then fall until they contact the top of container 38 and flow over and down the sides of container 38. The liquid droplets running down over the sides of container 38 are also exposed to carbon dioxide for further carbonation thereof.

Due to the horizontal disposition of cooler-carbonator 10 and the size of container 38, the liquid has a relatively large area exposed to the carbon dioxide, and since the liquid droplets do not fall directly, but roll over the surface of container 38, they are exposed to the carbon dioxide for a relatively long time. Further, since container 38 forms the exterior wall of the refrigeration chamber 42, the liquid rolling over the surface thereof is cooled even as it is carbonated. The liquid collects in the storage portion 64 of chamber 54, and the carbonated liquid is held at its level of carbonation by the introduction of carbon dioxide at port 58 at the bottom thereof. The carbon dioxide introduced through port 58 also serves to carbonate the incoming liquid after passing through the stored carbonated liquid.

Control of the fluid flow in carbonator 10 is achieved by means of solenoid valves 66 and 68 and pump 20. Valve 66 is a two-way valve connected to control the flow of carbonated liquid from outlet port 60. Operation of valve 66 is controlled by an electrical solenoid (not shown) which is actuated when it is desired to withdraw carbonated liquid from cooler-carbonator 10.

Pump 20 maintains an elevated pressure of the liquid in the liquid storage chamber 16. The elevated pressure of the liquid forces the liquid through outlet port 36 when solenoid valve 68 is actuated. Solenoid valve 68 is a three-way valve controlled by an electrical solenoid (not shown). Three-way valve 68 has outlet stems 70 and 72. Solenoid valve 68 is positioned to control the output of cooled liquid from storage chamber 16 through outlet port 36. If it is desired to obtain cooled non-carbonated liquid, solenoid valve 68 will be actuated (e.g., by a manual actuator for the control solenoid) to provide cooled non-carbonated liquid through stem 70. On the other hand, if it is desired to increase the amount of carbonated liquid in the carbonation chamber 54, solenoid valve 68 is actuated to produce a flow of cooled liquid through stem 72. Cooled liquid from stem 72 of valve 68 passes through a check valve 74 to the inlet port 56 of carbonation chamber 54. Double check valve 74 serves to prevent the carbon dioxide in chamber 54 from passing back through valve 68 to liquid storage chamber 34 when valve 68 is actuated. The flow of cooled liquid from storage chamber 34 to carbonation chamber 54 through valve 68 may be caused by manual actuation of the control solenoid for valve 68, although it is more common to have this control solenoid automatically actuated when the level of carbonated liquid in the carbonation chamber 54 falls below a predetermined level. Actuation of solenoid valve 68 to withdraw liquid from storage chamber 16 results in simultaneous activation of pump 20 to replace the liquid removed and to maintain the elevated pressure in storage chamber 16. A common method of sensing the liquid level and determining actuation of the control solenoid is to utilize electrodes in conjunction with a relay and an isolation transformer. Alternatively, it is possible to provide a separate pressure measuring and regulating means in storage chamber 34 so that pump 20 is actuated whenever the pressure in storage chamber 16 falls below a predetermined pressure.

The description of cooler-carbonator 10 indicates that the structure thereof comprises containers 12, 38, and 52 with containers 12 and 38 telescoped within container 52. While these containers have been described as concentric cylinders, it should be realized that the containers need be neither cylindrical nor concentric to achieve the purposes described herein. Further, it should be realized that while refrigeration chamber 42 has been described as annular with a short cylindrical portion thereof, it could as well be completely annular, or it could comprise a length of tubing helically wound about liquid storage container 12.

FIGURES 3 and 4 illustrate another embodiment of this invention, and yet a third embodiment is illustrated in FIGURES 5 and 6. For purposes of the description of these additional embodiments, elements thereof corresponding to the FIGURE 1 embodiment will be identified by primed numerals corresponding to the designating numerals therefor in FIGURES 1 and 2.

In FIGURES 3 and 4 a cooler-carbonator 76 is illustrated. In this embodiment, the baffle arrangement in the liquid storage chamber 16' has been somewhat altered from that illustrated in the FIGURE 1 embodiment. Baffles 78, 80, and 82 are placed at an angle to a vertical plane along the axis of cooler-carbonator 76. An opening 84 is provided at the right end of baffle 82 (FIGURE 3 orientation), and similar openings 86 and 88 are formed at left end of baffle 80 and right end of baffle 78 respectively (FIGURE 3 orientation). Thus, liquid entering port 18' will flow the entire length of container 12' (FIGURE 3 orientation) until it passes through the opening 84 in baffle 82, then the liquid flows along the space between baffles 80 and 82 back along the entire length of container 12' until it passes through the opening 86 at the left end of baffle 80. After passing through opening 86 the liquid flows back along the entire length of container 12' between baffles 78 and 80 until it passes through the opening 88 at the right end of baffle 78, and then the liquid flows along the entire length of container 12' until it can be withdrawn through port 36'.

In operation, the liquid storage chamber 16' would be nearly full so that the maximum cooling of the liquid will result. Adjacent and below liquid inlet port 18' there is located a thermostatic element 90. If the temperature of the liquid in storage chamber 16' rises above a specified predetermined level, thermostatic element 90 will cause activation of the refrigeration cycle to lower the liquid temperature. As thermostatic element 90 is immediately adjacent the liquid inlet port 18', any insertion of new liquid into the storage chamber 16' will result in activation of the refrigeration cycle.

An air vent valve 92 is located at the top of the space between baffle 82 and the wall of container 12'. This is the last place in the liquid storage chamber 16' that would become filled with liquid, and thus the air in chamber 16' prior to initiation of cooler-carbonator operation will be forced into this space when liquid is introduced into the chamber 16'. In order to prevent an undesired build-up of air pressure in the chamber, the air vent valve 92 will operate to release the air as the pressure thereof increases to thus maintain the air pressure at a desired lower level, but the air vent valve 92 operates to prevent the stored liquid from escaping therethrough after all of the air has been released.

To automatically actuate the appropriate solenoid valve to cease production of carbonated liquid or to initiate additional production thereof, a pair of liquid level testing electrodes 94 and 96 are utilized. The electrodes 94 and 96 are appropriately incorporated into a regulatory circuit (e.g., a circuit including a relay and an isolating transformer), so that when the liquid in the carbonation chamber 54 falls below a predetermined level, the regulatory circuit will appropriately actuate pump 20 and the solenoid valve 68 to introduce liquid from the storage chamber 16 into the carbonation chamber 54. When the liquid in the carbonation chamber 54 rises above a predetermined level, the regulatory circuit appropriately actuates solenoid valve 68 and pump 20 to terminate the flow of liquid.

It should also be noted that in the FIGURE 3 embodiment the carbon dioxide inlet port 58' is located at the top of carbonation chamber 54', rather than at the bottom thereof as in the FIGURE 1 embodiment. The carbon dioxide inlet port 58' may be located at either the top or the bottom of the carbonation chamber 54', but when the port is located at the bottom of the chamber a check valve is needed to prevent the escape of carbonated liquid. Therefore, it is more economical to place the inlet port at the top of the chamber, as this permits the elimination of a check valve.

In FIGURES 5 and 6 yet another embodiment of the subject invention is illustrated. In this embodiment slightly differently shaped chambers are utilized. Container 12' is closed at its right-hand end (FIGURE 5 orientation) by a convex end wall 98. The left-hand end of container 12' is sealed by a closure cap arrangement 100 that mates with flanged out portion 102 of container 12'. Flanged out portion 102 of container 12' has a diameter such that it will telescopically mate with container 38'. Flanged in portion 104 of container 52' is of a diameter that it will telescopically mate with container 38'. Thus, closure cap arrangement 100, flanged out portion 102 of container 12', container 38', and flanged in portion 104 of container 52' will all telescopically mate, and they all may be welded together to form a liquid and gas tight seal for each of the chambers 16', 42' and 54'.

A slightly different baffle arrangement is utilized in chamber 16'. As in the FIGURE 1 embodiment, a series of three baffles 106, 108, and 110 control the liquid flow in the liquid storage chamber 16'. However, rather than being horizontally disposed as are baffles 22, 24, and 26 in the FIGURE 1 embodiment, baffles 106, 108, and 110 are vertically positioned and perpendicular to the axis of container 12'. Thus, as liquid is introduced through port 18', it fills the space 105 to the left (FIGURE 5 orientation) of baffle 106 until the liquid flows to the space 107 between baffles 106 and 108 through opening 112 at the top of baffle 106. The liquid then continues through the opening 114 at the bottom of baffle 108 to the space 109 between baffles 108 and 110. When the spaces 107 and 109 are both full, the liquid then flows through passage 116 at the top of baffle 110 to the space 111 between baffle 110 and convex end 98 (FIGURE 5 orientation).

A thermostatic element 118 is placed in the space to the left of baffle 106 to control the refrigeration cycle of refrigeration chamber 42'.

As in the FIGURE 3 embodiment, an air vent valve 120 is located in liquid storage chamber 16'. In this case the air vent valve 120 is located in the space to the left of baffle 106. It will be noted that an end 122 of the air vent valve structure extends above the tops of baffles 106 and 110 (indicated by line 124 in FIGURE 6) so that it will receive the last air in chamber 16' should chamber 16' be completely filled with liquid.

The liquid extracted from liquid outlet port 36' is obtained from the space 111 to the right of baffle 116 in chamber 16' by means of a tube 126.

As in the case of container 12', containers 38' and 52' are also sealed at their right-hand ends (FIGURE 5 orientation) by convexly shaped closure members 128 and 130 respectively. It should be noted that containers 38' and 52' are individually closed at their right hand ends (FIGURE 5 orientation) rather than having a common closure as in the other embodiments.

Testing electrodes 132 and 134 are located in the carbonation chamber 54' so that the level of the carbonated liquid can be detected and maintained by appropriate regulatory means. The operation of electrodes 132 and 134 is essentially the same as the operation described in connection with the embodiment illustrated in FIGURES 3 and 4.

As in the case of the FIGURE 3 embodiment, the operation of the FIGURE 5 embodiment is essentially that described in connection with the FIGURE 1 embodiment and thus need not be repeated at this point.

It should be understood that the embodiments described are merely exemplary of the preferred practices of the present invention and that various changes, modifications, and variations may be made in the arrangements, operations and details of construction of the elements disclosed herein, without departing from the spirit and scope of the present invention, as defined in the appended claims.

What is claimed is:
1. An apparatus for carbonating liquid comprising:
   a horizontally positioned liquid storage chamber;
   a refrigeration unit located about said liquid storage chamber;
   a horizontally positioned carbonation chamber located about said refrigeration unit and said liquid storage chamber;
   means for introducing liquid into said liquid storage chamber;
   means for transferring liquid from said liquid storage chamber to said carbonation chamber;
   means for spreading the liquid transferred from said storage chamber into said carbonation chamber in a fine film over the outer surface of said refrigeration unit;

means for introducing carbon dioxide into said carbonation chamber to carbonate the liquid therein; and
means for extracting carbonated liquid from said carbonation chamber.

2. An apparatus for carbonating liquid as claimed in claim 1 and further comprising a thermostatic element located in said liquid storage chamber to detect the liquid temperature and control the refrigeration unit.

3. An apparatus for carbonating liquid as claimed in claim 1 and further comprising an air release vent valve located in said liquid storage chamber to permit the escape of air entrapped in said liquid storage chamber while preventing passage of the liquid stored therein.

4. An apparatus for carbonating liquid as claimed in claim 1 and further comprising a pair of electrodes located in said carbonation chamber and adapted to detect a carbonated liquid level in said carbonation chamber below a predetermined limit to initiate refilling of said carbonation chamber.

5. An apparatus for carbonating liquid comprising:
a first horizontally disposed generally cylindrical container having a given diameter and forming an innermost chamber;
a second horizontally disposed generally cylindrical container having a diameter greater than said given diameter of said first container, said second container surrounding said first container to form a middle chamber therebetween;
a third horizontally disposed generally cylindrical container having a diameter greater than said diameter of said second container, said third container surrounding said second container to form an outermost chamber therebetween;
inlet means extending into said innermost chamber to introduce fresh liquid into said innermost chamber;
outlet means extending from said innermost chamber to remove liquid from said innermost chamber;
refrigeration inlet means extending into said middle chamber in order to introduce compressed refrigerant into said middle chamber, said refrigerant expanding therein to adsorb heat and refrigerate said innermost and said outermost chambers;
refrigeration outlet means extending from said middle chamber and adapted to remove expanded refrigerant from said middle chamber;
liquid transfer and introducing means to convey the liquid from said innermost chamber and to inject the liquid into said outermost chamber in such a manner that the liquid is spread over the outer surface of said middle chamber in a thin film;
carbon dioxide inlet means extending into said outermost chamber in order to introduce carbon dioxide into said outermost chamber; and
outlet means extending from said outermost chamber and adapted to release carbonated liquid from said outermost chamber.

6. An apparatus for carbonating liquid as claimed in claim 5 wherein said liquid transfer and introducing means comprises a nozzle extending into said outermost chamber and adapted to spray liquid droplets into said outermost chamber.

7. An apparatus for carbonating liquid comprising:
a first horizontally disposed generally cylindrical container having a given diameter and forming an innermost chamber;
a second horizontally disposed generally cylindrical container having a diameter greater than said given diameter of said first container, said second container surrounding said first container to form a middle chamber therebetween;
a third horizontally disposed generally cylindrical container having a diameter greater than said diameter of said second container, said third container surrounding said second container to form an outermost chamber therebetween;
inlet means extending into said innermost chamber to remove liquid from said innermost chamber;
baffle means positioned in said innermost chamber to prevent mixing of liquid introduced into said innermost chamber and liquid being removed from said innermost chamber;
refrigeration inlet means extending into said middle chamber in order to introduce compressed refrigerant into said middle chamber, said refrigerant expanding therein to adsorb heat and refrigerate said innermost and said outermost chambers;
refrigeration outlet means extending from said middle chamber and adapted to remove expanded refrigerant from said middle chamber;
liquid transfer and introducing means to convey the liquid from said innermost chamber and to inject the liquid into said outermost chamber in such a manner that the liquid is spread over the outer surface of said middle chamber in a thin film;
carbon dioxide inlet means extending into said outermost chamber in order to introduce carbon dioxide into said outermost chamber; and
outlet means extending from said outermost chamber and adapted to release carbonated liquid from said outermost chamber.

8. An apparatus for carbonating liquid as claimed in claim 7 wherein said baffle means comprises three separate baffles, each of which is parallel to the central axis of the apparatus and perpendicular to a vertical plane located along said central axis.

9. An apparatus for carbonating liquid as claimed in claim 7 wherein said baffle means comprises three separate baffles, each of which is parallel to the central axis of the apparatus and diagonally positioned with respect to a vertical plane located along said central axis.

10. An apparatus for carbonating liquid as claimed in claim 7 wherein said baffle means comprises three separate baffles, each of which is perpendicular to the central axis of the apparatus and perpendicular to a vertical plane located along said central axis.

11. An apparatus for carbonating liquid as claimed in claim 10 wherein said innermost chamber outlet means is a tubular conduit extended into said innermost chamber along the central axis of said innermost chamber and through said baffle means to the rear of said innermost chamber.

12. An apparatus for carbonating liquid as claimed in claim 5 and further comprising:
a first common end wall sealing a first end of each of said three generally cylindrical containers;
a second end wall sealing a second end of said first container; and
a third common end wall sealing a second end of said second and said third generally cylindrical containers.

13. An apparatus for carbonating liquid as claimed in claim 5 and further comprising:
a first common end wall sealing a first end of each of said three generally cylindrical containers;
a second end wall sealing a second end of said first generally cylindrical container;
a third end wall sealing a second end of said second generally cylindrical container; and
a fourth end wall sealing a second end of said third generally cylindrical container.

14. An apparatus for carbonating liquid as claimed in claim 6 wherein said liquid transfer and introducing means comprises a nozzle extending into said outermost chamber and adapted to spray liquid droplets into said outermost chamber and further comprising:
a thermostatic element located in said innermost chamber to detect the temperature of liquid therein and control the introduction of refrigerant to said middle chamber;
an air release valve located in said innermost chamber to let undesired air escape from said innermost chamber;

a pair of electrodes located in said outermost chamber and adapted to detect a carbonated liquid level below a specified limit to initiate refilling of said outermost chamber; and a baffle arrangement located in said innermost chamber and adapted to prevent newly inserted liquid from mixing with liquid already present in said innermost chamber.

References Cited

UNITED STATES PATENTS

| | | | |
|---|---|---|---|
| 1,937,802 | 12/1933 | Baer | 62—394 |
| 2,035,391 | 3/1936 | Lear | 62—394 |
| 2,267,819 | 12/1941 | Di Pietro | 62—394 |
| 2,337,783 | 12/1943 | Thompson | 62—177 |
| 2,348,791 | 5/1944 | Di Pietro | 62—306 |
| 2,434,374 | 1/1948 | Tull | 62—306 |
| 2,541,757 | 2/1951 | Grier | 62—306 |
| 2,648,274 | 8/1953 | Bendfelt | 62—306 |
| 2,781,648 | 2/1957 | Lyman | 62—394 |
| 2,201,430 | 5/1940 | Diebel | 261—153 |

WILLIAM J. WYE, Primary Examiner

U.S. Cl. X.R.

62—178, 180, 306, 307, 394; 261—140